US010054343B2

(12) United States Patent
Takada et al.

(10) Patent No.: US 10,054,343 B2
(45) Date of Patent: Aug. 21, 2018

(54) THROTTLE DEVICE

(71) Applicant: Kabushiki Kaisha Saginomiya Seisakusho, Tokyo (JP)

(72) Inventors: Yasumasa Takada, Sayama (JP); Yuichiro Toyama, Sayama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 31 days.

(21) Appl. No.: 15/303,342

(22) PCT Filed: Feb. 27, 2015

(86) PCT No.: PCT/JP2015/055871
§ 371 (c)(1),
(2) Date: Oct. 11, 2016

(87) PCT Pub. No.: WO2015/163002
PCT Pub. Date: Oct. 29, 2015

(65) Prior Publication Data
US 2017/0030614 A1 Feb. 2, 2017

(30) Foreign Application Priority Data

Apr. 21, 2014 (JP) ................................. 2014-087454

(51) Int. Cl.
*F25B 41/04* (2006.01)
*F16K 1/12* (2006.01)
(Continued)

(52) U.S. Cl.
CPC ............. *F25B 41/04* (2013.01); *F16K 1/126* (2013.01); *F16K 15/063* (2013.01);
(Continued)

(58) Field of Classification Search
CPC ...... G05D 7/014; G05D 7/0133; F25B 41/06; F25B 41/062; F25B 2341/063;
(Continued)

(56) References Cited

U.S. PATENT DOCUMENTS 2,542,802 A * 2/1951 Ehlke .................... F25B 41/062
236/92 B
2,786,336 A * 3/1957 Lange ................... F25B 41/062
236/92 B
(Continued)

FOREIGN PATENT DOCUMENTS

CN 2295085 Y 10/1998
CN 201053524 Y 4/2008
(Continued)

OTHER PUBLICATIONS

EP Extended Search Report for EP Application No. 15782973.0 dated Mar. 15, 2017 (6 pages).
(Continued)

*Primary Examiner* — Mary McManmon
*Assistant Examiner* — Nicole Gardner
(74) *Attorney, Agent, or Firm* — Reising Ethington P.C.

(57) ABSTRACT

A throttle device to decompress a refrigerant and to deliver the refrigerant to an evaporator, may have an opening level of a needle valve controlled following a condensation pressure. Inside a case including a primary chamber connected to the condenser and a secondary chamber connected to the evaporator, a valve seat formed with a port and a guide integral to the valve seat are provided. A spring to energize the needle valve toward the port side is provided inside the guide. The guide guides the needle valve along a line allowing an opening level of the port to be variable. A space between the guide and the case forms a channel to deliver the refrigerant from the port to the secondary chamber. A (Continued)

rear space of the needle valve within the guide forms an intermediate chamber. An intermediate channel introduces the refrigerant from the port into the intermediate chamber.

6 Claims, 5 Drawing Sheets

(51) Int. Cl.
   *F16K 15/06* (2006.01)
   *F25B 41/06* (2006.01)
   *F16K 17/04* (2006.01)
(52) U.S. Cl.
   CPC ........ *F16K 17/0433* (2013.01); *F25B 41/062* (2013.01); *F25B 2600/2515* (2013.01)
(58) Field of Classification Search
   CPC .... F25B 2500/04; F25B 41/043; F16K 17/22; F16K 17/30; F16K 17/34
   USPC ....................................... 236/92 B
   See application file for complete search history.

(56) References Cited

U.S. PATENT DOCUMENTS

| | | | | |
|---|---|---|---|---|
| 3,372,902 | A | * | 3/1968 | Rudibert .............. F16K 1/38 251/149.6 |
| 3,744,268 | A | * | 7/1973 | Widdowson .......... F25B 41/043 62/217 |
| 3,810,488 | A | * | 5/1974 | Orth .................... F16K 17/105 137/489.3 |
| 4,343,328 | A | * | 8/1982 | Junger .................. F16K 17/34 137/491 |
| 6,289,924 | B1 | * | 9/2001 | Kozinski .............. F25B 41/062 137/497 |
| 9,170,039 | B2 | | 10/2015 | Thybo et al. |
| 9,279,512 | B2 | | 3/2016 | Kajita et al. |
| 2006/0117793 | A1 | * | 6/2006 | Tsugawa ............... F25B 41/06 62/527 |
| 2013/0206851 | A1 | * | 8/2013 | Sekiguchi ............. F16K 31/04 236/92 B |
| 2016/0018142 | A1 | | 1/2016 | Thybo et al. |

FOREIGN PATENT DOCUMENTS

| | | |
|---|---|---|
| CN | 101520100 A | 9/2009 |
| CN | 202220859 U | 5/2012 |
| CN | 202451894 U | 9/2012 |
| CN | 202914833 U | 5/2013 |
| CN | 103225703 A | 7/2013 |
| CN | 203036925 U | 7/2013 |
| CN | 103339453 A | 10/2013 |
| EP | 1167899 A2 | 1/2002 |
| EP | 1512926 A2 | 3/2005 |
| JP | S5544149 A | 3/1980 |
| JP | S5544150 A | 3/1980 |
| JP | S5925756 U | 2/1984 |
| JP | H11148572 A | 6/1999 |
| JP | 2008138812 A | 6/2008 |

OTHER PUBLICATIONS

Written Opinion & International Search Report for PCT/JP2015/055871 dated Apr. 7, 2015, 7 pages.
CN Office Action for CN Application No. 201580015406.X dated Jan. 23, 2018 (11 pages).

* cited by examiner

CROSS SECTION A-A

CROSS SECTION A—A

THROTTLE DEVICE

TECHNICAL FIELD

The present invention relates to a throttle device provided between a condenser and an evaporator in a refrigerating cycle of an air conditioner or the like.

BACKGROUND ART

Conventionally, throttle devices of the above type includes those disclosed in, for example, JP 55-44149 A (Patent Literature 1), JP 55-44150 A (Patent Literature 2), and JP 59-25756 U (Patent Literature 3).

The above conventional throttle devices include a differential pressure type expansion valve, where a valve opening level varies according to a differential pressure between a pressure of a refrigerant on a condenser side (primary side) and a pressure of the refrigerant on an evaporator side (secondary side) and have a coil spring (spring) to energize a valve body in a valve closing direction against a force generated by this differential pressure. Valve opening level characteristics are specified according to this differential pressure and a spring constant of the coil spring.

CITATION LIST

Patent Literature

Patent Literature 1: JP 55-44149 A
Patent Literature 2: JP 55-44150 A
Patent Literature 3: JP 59-25756 U

SUMMARY OF INVENTION

Technical Problem

In the conventional throttle devices (differential pressure type expansion valves), a valve opening level is determined by an assumed differential pressure in nominal operation and thus preferable control can be obtained. However when a pressure in a secondary side (pressure of an evaporator) becomes high for example, a differential pressure becomes smaller than an assumed value and a valve closes, where a pressure in a primary side (pressure of a condenser) is caused to be high following the pressure in the secondary side. Therefore, when the pressure in the secondary side rises excessively or upon initiation of operation of the compressor, the pressure of the condenser also rises more than necessary. As a result of this, there is a problem that a discharge temperature of the compressor also rises abnormally and the compressor halts.

Moreover, in a configuration as in FIG. 2 of Patent Literature 3, a coil spring is arranged in a flow channel of a refrigerant after passing a valve port. Therefore there are problems of amplified sound due to vibration caused by cavitation transferred to the coil spring and generation of abnormal sound due to vibration of the passing refrigerant transferred to the coil spring.

The present invention has been devised in order to solve the above problems with an object to control the valve opening level of the valve body following not only the differential pressure between the pressure in the primary side and the pressure in the secondary side but also a condensation pressure.

Solution to Problem

A throttle device of a first aspect is a throttle device, provided between a condenser and an evaporator in a refrigerating cycle, to decompress a refrigerant cooled by the condenser and to deliver the refrigerant to the evaporator, the device including: a main body case including a primary chamber connected to the condenser and a secondary chamber connected to the evaporator; a valve seat member, formed with a valve port, arranged inside the main body case and between the primary chamber and the secondary chamber; a cylindrical guide member, coaxial with an axial line of the valve port, arranged on the secondary chamber side inside the main body case; a valve body to allow an opening level of the valve port to be variable by moving along the axial line while guided by the guide member; and a spring member, arranged inside the guide member, to energize the valve body toward the valve port, where a space between the guide member and the main body case forms a main body side flow channel to deliver the refrigerant from the valve port to the secondary chamber, a rear space of the valve body within the guide member forms an intermediate pressure chamber, and an intermediate pressure introduction channel to introduce the refrigerant from the valve port into the intermediate pressure chamber is provided.

A throttle device of a second aspect is the throttle device of the first aspect, where a flow channel area of the intermediate pressure introduction channel is smaller than a flow channel area of the main body side flow channel.

A throttle device of a third aspect is the throttle device of the first or the second aspect, where the intermediate pressure introduction channel is formed by a space between the valve body and the guide member.

A throttle device of a fourth aspect is the throttle device of the first or the second aspect, where the intermediate pressure introduction channel is formed inside the valve body.

Advantageous Effects of Invention

According to the throttle device of the first aspect, in the throttle device to decompress the refrigerant cooled by the condenser in the refrigerating cycle and to deliver the refrigerant to the evaporator, an intermediate pressure close to a pressure in the primary chamber is introduced to the intermediate pressure chamber that is a rear space of the valve body, thereby allowing for control following a condensation pressure better as compared to control only by a differential pressure between the pressure in the primary chamber and a pressure in the secondary chamber. This allows for continuing cooling operation according to the condensation pressure even when the pressure in the secondary chamber becomes high.

According to the throttle device of the second aspect, the refrigerant introduced from the intermediate pressure introduction channel into the intermediate pressure chamber has a substantially smaller flow rate than that of the refrigerant flowing in the main body side flow channel. Therefore, in addition to the effect of the first aspect, noise is not generated when the refrigerant passes through the spring member in the intermediate pressure chamber.

According to the throttle device of the third aspect, in addition to the effect of the first or the second aspect, the intermediate pressure introduction channel for introducing the refrigerant from the valve port into the intermediate pressure chamber can be easily formed.

According to the throttle device of the fourth aspect, the intermediate pressure introduction channel for introducing the refrigerant from the valve port into the intermediate pressure chamber is formed inside the valve body. Therefore, in addition to the effect of the first or the second aspect, a flow rate of the refrigerant flowing in the intermediate pressure introduction channel can be easily set.

DESCRIPTION OF EMBODIMENTS

Figures 1A, 1B:
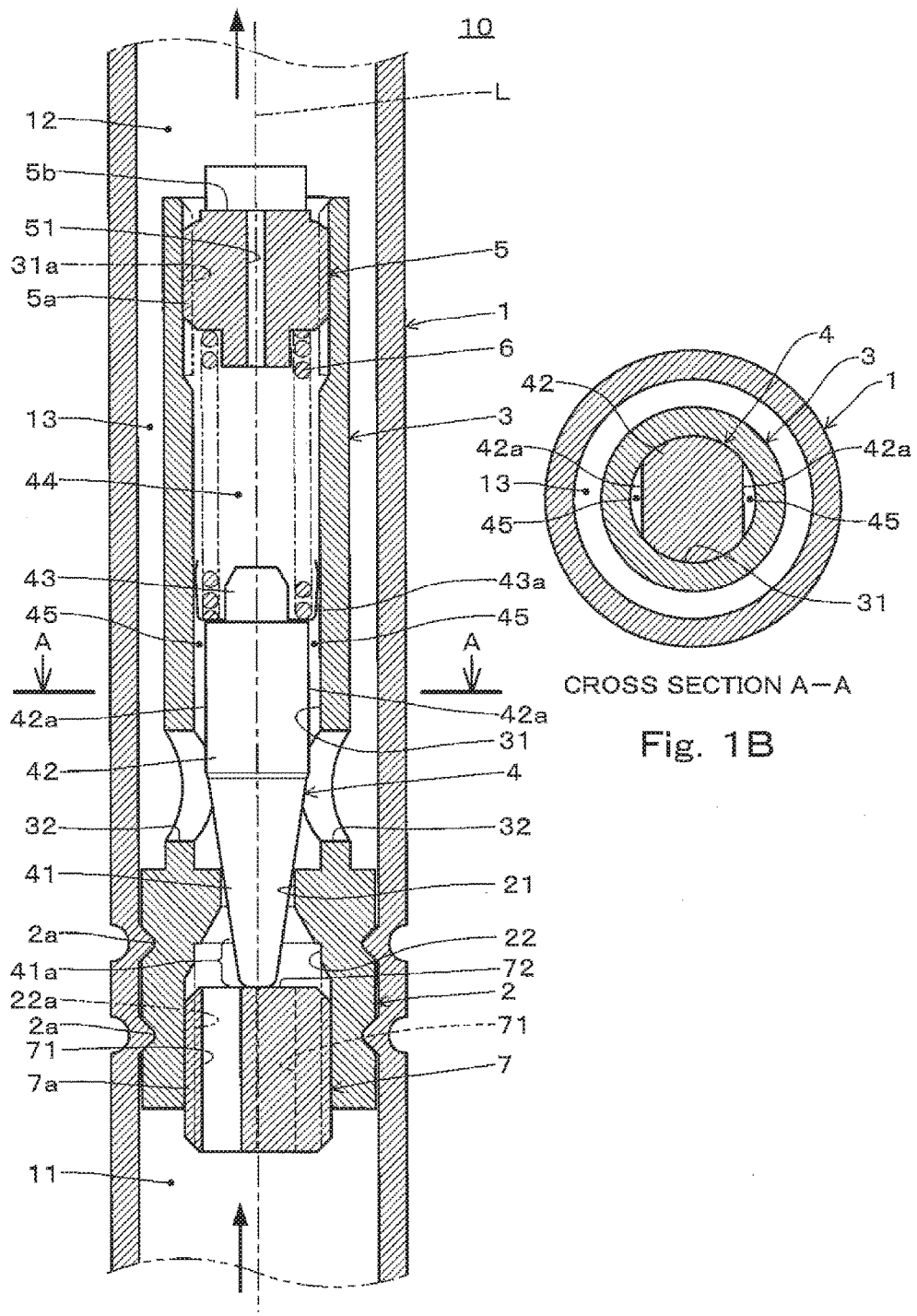
FIGS. 1A and 1B are a vertical cross-sectional view and a horizontal cross-sectional view, respectively, of a throttle device of a first embodiment of the present invention.
Figure 2A:
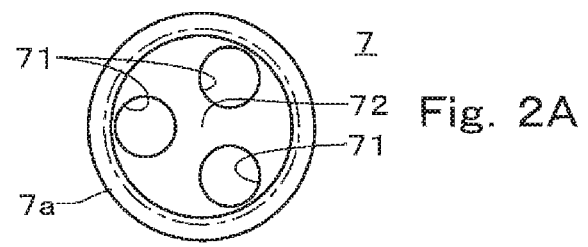
FIGS. 2A and 2B are a plan view and a vertical cross-sectional view, respectively, of a stopper member of the throttle device of the first embodiment.
Figure 2B:
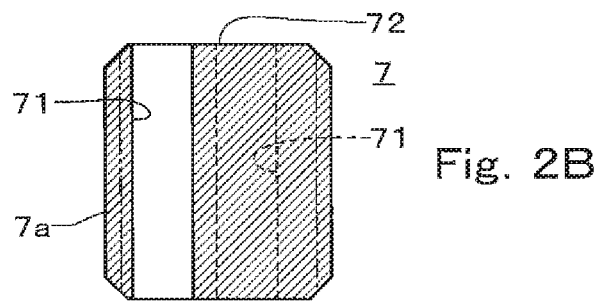
Figure 3:
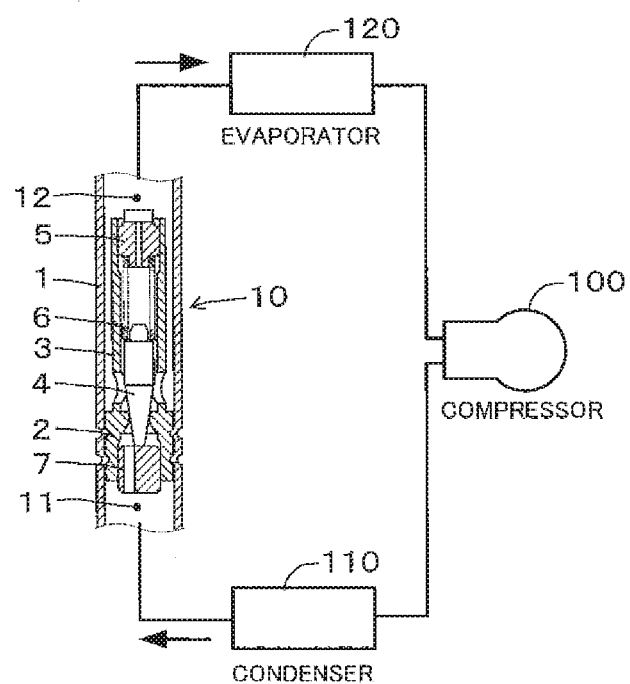
FIG. 3 is a diagram illustrating a schematic configuration of a refrigerating cycle of the embodiment.
Figures 5A, 5B:
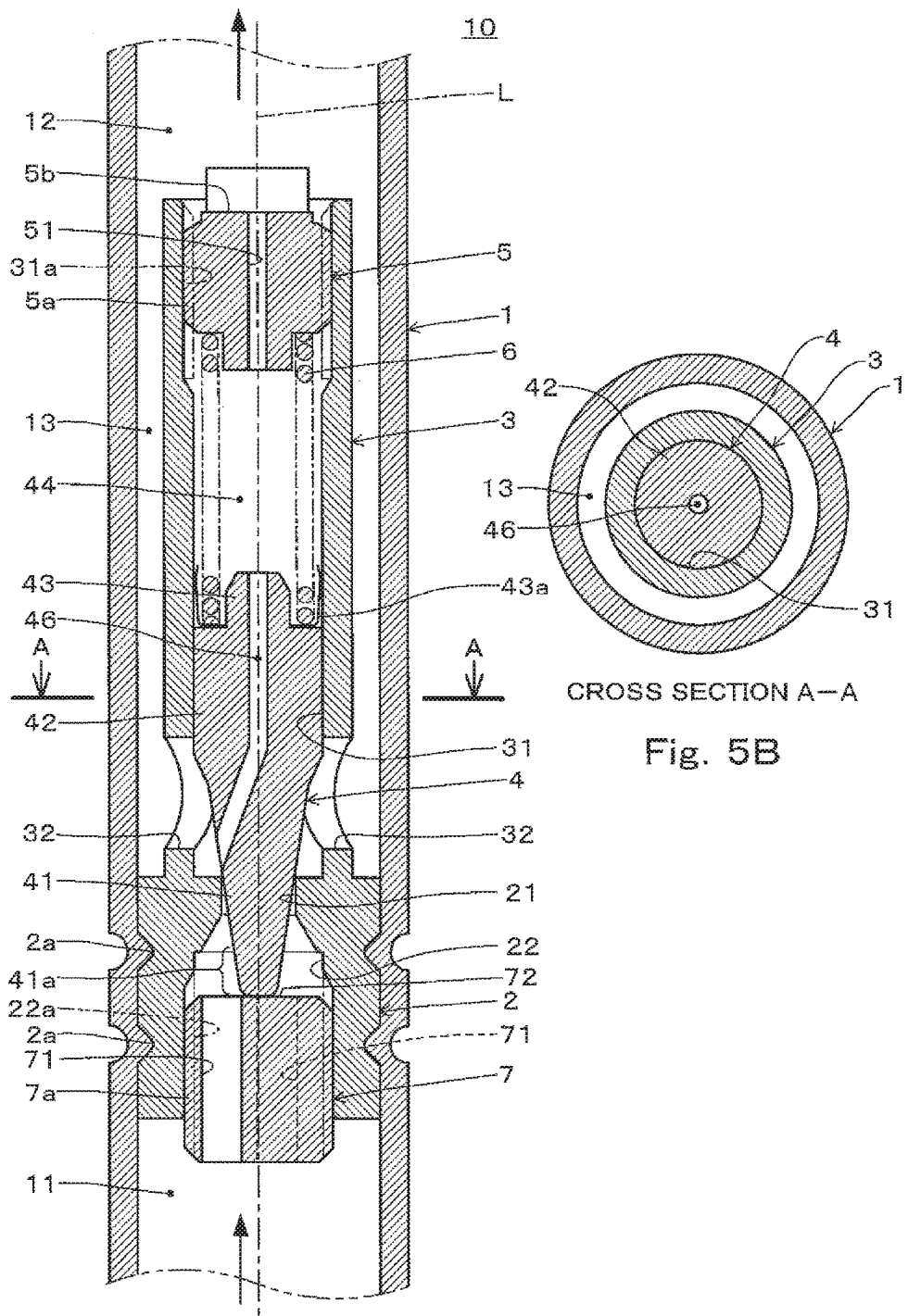
FIGS. 5A and 5B are a vertical cross-sectional view and a horizontal cross-sectional view, respectively, of a throttle device of a second embodiment of the present invention.
Figures 6A, 6B:
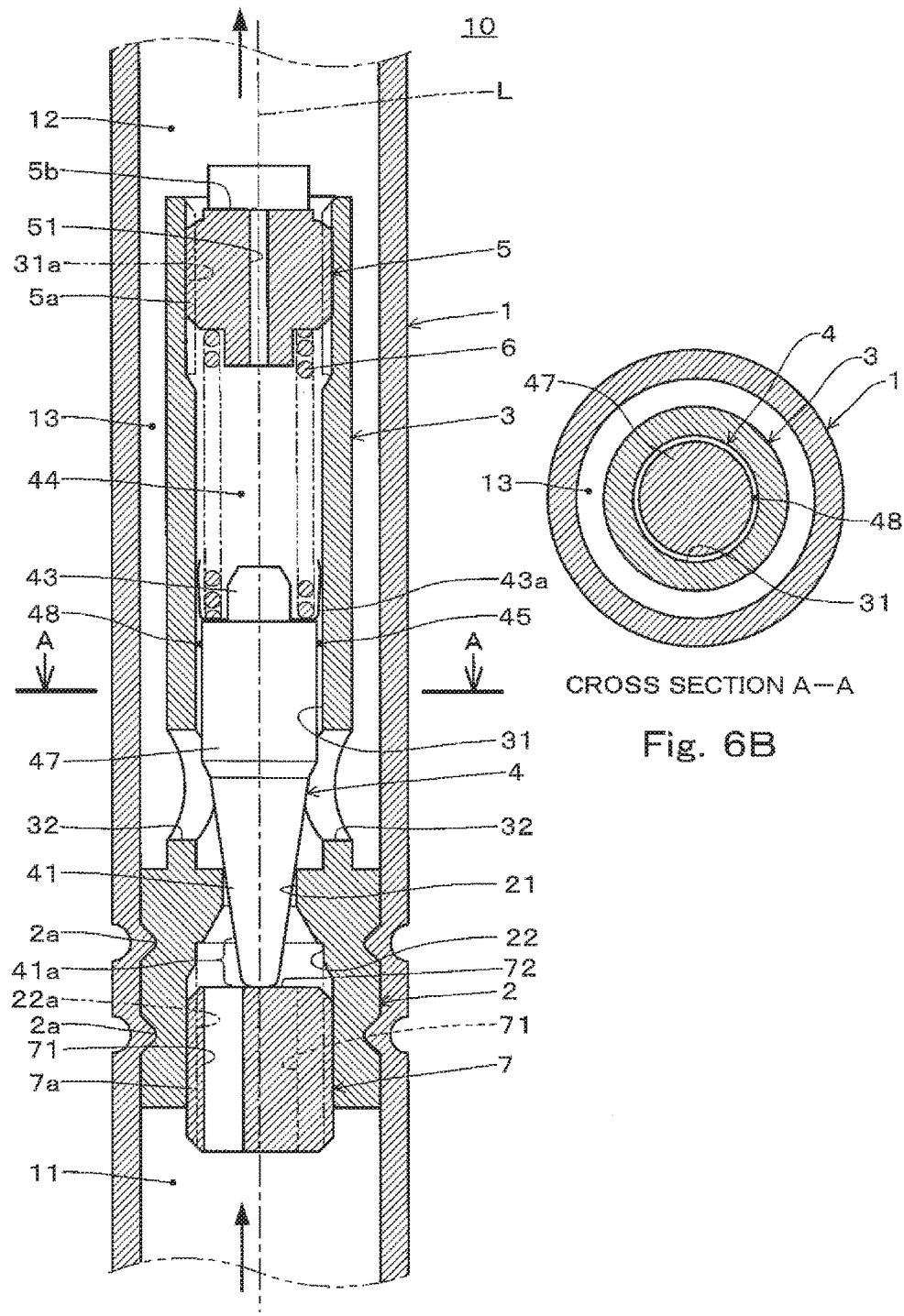
FIGS. 6A and 6B are a vertical cross-sectional view and a horizontal cross-sectional view, respectively, of a throttle device of a third embodiment of the present invention.

Next, embodiments of a throttle device of the present invention will be described with reference to the drawings. FIGS. 1A and 1B are a vertical cross-sectional view and a horizontal cross-sectional view, respectively, of a throttle device of a first embodiment. FIGS. 2A and 2B are a plan view and a vertical cross-sectional view, respectively, of a stopper member of the throttle device of the first embodiment and FIG. 3 is a diagram illustrating a schematic configuration of a refrigerating cycle of the embodiment. Incidentally, FIGS. 1B, 5B, and 6B are cross sections along A-A in FIGS. 1A, 5A, and 6A, respectively.

First, the refrigerating cycle in FIG. 3 will be described. This refrigerating cycle configures an air conditioner for vehicles for example and includes a compressor 100 where a power of a vehicle is transferred, a condenser 110, a throttle device 10 of the embodiment, and an evaporator 120. A refrigerant compressed by the compressor 100 is supplied to the condenser 110. The refrigerant cooled by the condenser 110 is delivered to the throttle device 10. The throttle device 10 decompresses and expands the refrigerant as described later and delivers the refrigerant to the evaporator 120. The evaporator 120 then cools the inside of the vehicle, thereby providing a function of air-cooling. The refrigerant evaporated by the evaporator 120 is circulated to the compressor 100.

As illustrated in FIGS. 1A and 1B, the throttle device 10 includes a main body case 1 of a metal tube, a valve seat member 2 made of a metal, a guide member 3, a needle valve 4 as a "valve body", an adjusting screw 5, a coil spring 6 as a "spring member", and a stopper member 7. Incidentally, the valve seat member 2 and the guide member 3 are integrally formed by cutting a metal material or the like.

The main body case 1 has a cylindrical shape with an axial line L in the center thereof and includes a primary chamber 11 connected to the condenser 110 and a secondary chamber 12 connected to the evaporator 120. The valve seat member 2 has a substantially columnar shape that fits to an inner surface of the main body case 1. The whole perimeter of an outer peripheral surface of the valve seat member 2 (whole perimeter around the axial line L) is formed with a caulked groove 2a. Caulking the main body case 1 at a position of the caulked groove 2a allows for fixing the valve seat member 2 (and the guide member 3) inside the main body case 1. This allows the valve seat member 2 to be arranged between the primary chamber 11 and the secondary chamber 12.

Furthermore, the valve seat member 2 is formed with a valve port 21, which has the axial line L in the center thereof and forms a columnar hole, and a screw hole 22 which is coaxial with the valve seat member 2 and opens from the valve port 21 toward the primary chamber 11. At an inner circumference of the screw hole 22, a female screw portion 22a is formed.

The guide member 3 has a cylindrical shape and is provided to stand on the valve seat member 2 in the secondary chamber 12. A space between this guide member 3 and the main body case 1 forms a main body side flow channel 13. The guide member 3 includes a columnar guide hole 31 having the axial line L in the center thereof and is formed with an open hole 32 connecting the guide hole 31 and the outside (secondary chamber 12) at a position adjacent to the valve seat member 2. Furthermore on an inner circumferential surface at an end portion of the guide hole 31, a female screw portion 31a is formed.

The needle valve 4 has a needle portion 41 of a conical shape with an end face of a tip portion 41a formed substantially flat, an insertion portion 42 to be inserted in the guide hole 31 of the guide member 3, and a boss portion 43 formed at an end portion of the insertion portion 42. The insertion portion 42 has a substantially columnar shape. Inserting this insertion portion 42 in the guide hole 31 allows the needle valve 4 to be guided to move along the axial line L. Furthermore, a rear space of the needle valve 4 in the guide hole 31 forms an intermediate pressure chamber 44. Incidentally, the tip portion 41a of the needle portion 41 is a part of such a needle portion that does not come off the valve port 21 even when the needle valve 4 moves toward the secondary chamber 12 and an opening level of the valve port 21 becomes the largest while the valve opening level of the throttle device is controlled in a variable manner according to a differential pressure and thereby a flow rate of the refrigerant is adjusted.

Moreover, on two side surfaces of the insertion portion 42, D cut surfaces 42a are formed. A space between the D cut surface 42a and an inner surface of the guide hole 31 forms an intermediate pressure introduction channel 45 connecting a space on the valve port 21 side and the intermediate pressure chamber 44. Incidentally, the boss portion 43 is fitted into a spring with wings 43a which are slidingly in contact with an inner circumferential surface of the guide hole 31. This spring with wings 43a prevents vibration of the needle valve 4 due to a clearance between the needle valve 4 and the guide hole 31.

The adjusting screw 5 has a substantially columnar shape and is formed with a male screw portion 5a at a circumference thereof as well as a slit 5b, to which a flat tip screwdriver can be fitted, at an end portion on the secondary chamber 12 side. The adjusting screw 5 is further formed with a through hole 51 in the center thereof in a penetrating manner.

The coil spring 6 is arranged between the needle valve 4 and the adjusting screw 5 inside the guide hole 31 via the spring with wings 43a in a compressed state. Moreover, the adjusting screw 5 is attached to the guide member 3 with the male screw portion 5a in the circumference thereof screwed with the female screw portion 31a of the guide hole 31. This allows the coil spring 6 to energize the needle valve 4 toward the primary chamber 11. This energizing force to energize the needle valve 4 is adjusted by a degree how much the adjusting screw 5 is screwed with the guide member 3.

The stopper member 7 has a substantially columnar shape and is formed with a male screw portion 7a at a circumference thereof. This stopper member 7 is further formed with three introduction holes 71 around the axial line L. Moreover, the stopper member 7 is attached to the valve seat member 2 with the male screw portion 7a at the circumference thereof screwed with the female screw portion 22a of the screw hole 22 of the valve seat member 2.

In a state of FIGS. 1A and 1B, the tip portion 41a of the needle portion 41 of the needle valve 4 protrudes from the valve port 21 toward the primary chamber 11. An end face of the tip portion 41a of this needle portion 41 abuts against a stopper surface 72 of the stopper member 7 and a space is formed between this needle portion 41 and the valve port 21. That is, the needle valve 4 is not set on the valve seat member 2. This space between the needle portion 41 and the valve port 21 serves as an "orifice" to decompress and expand the refrigerant by throttling the flow of the refrigerant from the primary chamber 11 toward the secondary chamber 12. The tip portion 41a of the needle portion 41 (position of an end portion of the valve body on the primary chamber side) is positioned by the stopper member 7. A flow rate of the refrigerant flowing in this orifice, namely a bleed rate, can be adjusted by a degree how much the stopper member 7 is screwed with the valve seat member 2. In this manner, the bleed rate can be adjusted by a degree of screwing and thus can be adjusted extremely accurately. After adjusting a position of the stopper member 7, the stopper member 7 is fixed to the valve seat member 2 by, for example bonding, brazing, caulking, or the like.

Figure 4:
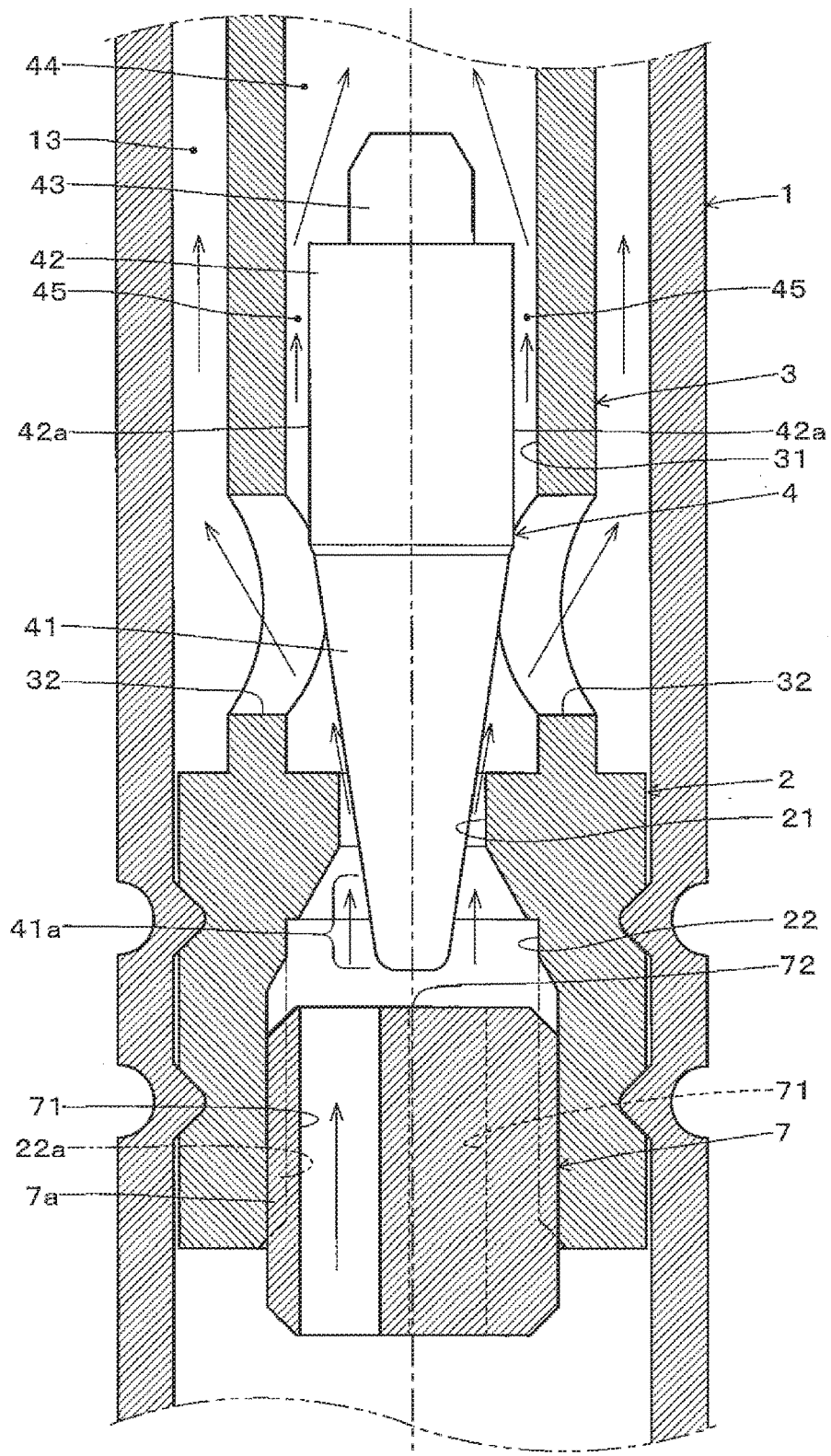
FIG. 4 is a diagram explaining a flow of a refrigerant in the throttle device of the first embodiment.

With the above configuration, when the high pressure refrigerant from the condenser 110 flows into the primary chamber 11, as illustrate by arrows in FIG. 4, the refrigerant in the primary chamber 11 travels through the introduction hole 71 of the stopper member 7, passes the space (orifice) between the valve port 21 and the needle portion 41, and flows into the guide hole 31. The refrigerant flowed into the guide hole 31 is divided while the refrigerant in one of the flows flows from the open hole 32 of the guide member 3 into the main body side flow channel 13 and the refrigerant in the other flow flows through the intermediate pressure introduction channel 45 into the intermediate pressure chamber 44. The refrigerant in the main body side flow channel 13 directly flows into the secondary chamber 12 while the refrigerant in the intermediate pressure chamber 44 flows into the secondary chamber 12 via the through hole 51 of the adjusting screw 5.

Here, a pressure of the refrigerant in the primary chamber 11, a pressure of the refrigerant in the intermediate pressure chamber 44, and a pressure of the refrigerant in the secondary chamber 12 are denoted as P1, PM, and P2, respectively. Since the intermediate pressure chamber 44 is introduced with the refrigerant immediately after passing the valve port 21, this pressure PM of the refrigerant in the intermediate pressure chamber 44 is higher than the pressure P2 of the refrigerant on the secondary chamber 12 side. That is, a relation of $$P2 < PM < P1$$

holds.

In this manner, the pressure PM in the intermediate pressure chamber 44 is caused to be a pressure (intermediate pressure) closer to the pressure P1 in the primary chamber 11 as compared to the pressure P2 in the secondary chamber 12.

The pressure P2 and the pressure PM apply force on the needle valve 4 in a valve closing direction while the pressure P1 applies force on the needle valve 4 in a valve opening direction. That is, force generated by a differential pressure between P1 and P2 and a differential pressure between P1 and PM acts on the needle valve 4 in the valve opening direction. A balance between this force generated by the differential pressures acting on the needle valve 4 and the energizing force of the coil spring 6 determines the position of the needle valve 4, that is, an opening level of the valve port 21.

Therefore, when this embodiment and a case where only the pressure P2 in the secondary chamber 12 acts in the valve closing direction because the intermediate pressure chamber 44 and the intermediate pressure introduction channel 45 are not included are compared at the same valve opening level, a spring constant of the coil spring 6 can be smaller in the embodiment than in the latter case by an amount of the pressure PM in the intermediate pressure chamber 44. Furthermore, the valve opening level can be determined by the pressure P1 in the primary chamber 11 and the pressure PM in the intermediate pressure chamber 44 which is closer to this pressure P1 and thus control better following a condensation pressure (pressure in the condenser 110) can be performed. This allows for continuing cooling operation according to the condensation pressure even when the pressure in the secondary chamber 12 becomes high.

Moreover, a flow channel area A2 of the intermediate pressure introduction channel 45 is smaller than a flow channel area A1 of the main body side flow channel 13. Therefore, the refrigerant introduced from the intermediate pressure introduction channel 45 into the intermediate pressure chamber 44 has a substantially smaller flow rate than that of the refrigerant flowing in the main body side flow channel 13. Therefore, noise is not generated when the refrigerant passes through the coil spring 6 in the intermediate pressure chamber 44.

Furthermore in this embodiment, since the needle valve 4 is not set on the valve seat member 2 due to the stopper member 7, for example even when the refrigerant is charged to the refrigerating cycle from a pipe on the secondary side and a high pressure is applied to the secondary chamber 12, the needle portion 41 does not bite into the valve port 21. Moreover, since a minimum space (orifice) is ensured between the needle portion 41 and the valve port 21 by the stopper member 7 as described above, even if a foreign substance is stuck in this space, opening the needle valve 4 allows the foreign substance to be drained therefrom. That is, in a configuration where a bleed port such as a small hole is included at a circumference of the valve port or the needle portion, the foreign substance may stay stuck. In the embodiment, however, this does not occur.

Also, since the stopper member 7 allows for fine adjustment of the position of the needle portion 41, the minimum space (orifice) between the needle portion 41 and the valve port 21 can be adjusted with a simple configuration. Moreover, since the stopper member 7 is arranged at a position connected to the valve port 21, back leakage (namely, leakage from a connecting section between the female screw portion 22a and the male screw portion 7a) or the like at a mounting portion of the stopper member 7 does not need to be considered at all.

FIGS. 5A and 5B are a vertical cross-sectional view and a horizontal cross-sectional view, respectively, of a throttle device of a second embodiment. Incidentally, in the following second and third embodiments, elements similar to those in the first embodiment are denoted with the same symbols as those in FIGS. 1A to 4 and overlapping descriptions thereon are omitted as appropriate. Also, throttle devices 10 in the second and the third embodiments are also included in the refrigerating cycle in FIG. 3 like in the first embodiment.

In the throttle device 10 of this second embodiment, a needle valve 4 includes an intermediate pressure introduction channel 46 running from a space on a valve port 21 side to an intermediate pressure chamber 44. This intermediate pressure introduction channel 46 is formed by a hole bored from a side surface of a needle portion 41 obliquely toward the center and a hole bored in the center of a boss portion 43 and an insertion portion 42. Furthermore, like in the first embodiment, a part of a refrigerant flowed from the valve port 21 passes this intermediate pressure introduction channel 46 and flows into the intermediate pressure chamber 44. Also in this second embodiment, therefore, control following a condensation pressure (pressure in a condenser 110) can be performed like in the first embodiment. This allows for continuing cooling operation according to the condensation pressure even when the pressure in the secondary chamber 12 becomes high.

Moreover, a flow channel area A2 of the intermediate pressure introduction channel 46 is smaller than a flow channel area A1 of a main body side flow channel 13. Therefore, the refrigerant introduced from the intermediate pressure introduction channel 46 into the intermediate pressure chamber 44 has a substantially smaller flow rate than that of the refrigerant flowing in the main body side flow channel 13. Therefore, noise is not generated when the refrigerant passes through a coil spring 6 in the intermediate pressure chamber 44. Incidentally, in this second embodiment, the flow rate is determined by a diameter of the intermediate pressure introduction channel 46 and thus the flow rate can be easily set.

FIGS. 6A and 6B are a vertical cross-sectional view and a horizontal cross-sectional view, respectively, of a throttle device of a third embodiment. In the first embodiment, forming the D cut surface 42a in the insertion portion 42 of the needle valve 4 allows for including the intermediate pressure introduction channel 45; however in this throttle device 10 of the third embodiment, an outer diameter of an insertion portion 47 of a needle valve 4 is smaller than an inner diameter of a guide hole 31, thereby allowing a space between the insertion portion 47 and the guide hole 31 to form an intermediate pressure introduction channel 48 that runs from a space on a valve port 21 side to an intermediate pressure chamber 44. Furthermore like in the first embodiment, a part of a refrigerant flowed from the valve port 21 passes this intermediate pressure introduction channel 48 and flows into the intermediate pressure chamber 44. Also in this third embodiment, therefore, control following a condensation pressure (pressure in a condenser 110) can be performed like in the first embodiment. This allows for continuing cooling operation according to the condensation pressure even when the pressure in the secondary chamber 12 becomes high.

Moreover, a flow channel area A2 of the intermediate pressure introduction channel 48 is smaller than a flow channel area A1 of a main body side flow channel 13. Therefore, the refrigerant introduced from the intermediate pressure introduction channel 48 into the intermediate pressure chamber 44 has a substantially smaller flow rate than that of the refrigerant flowing in the main body side flow channel 13. Therefore, noise is not generated when the refrigerant passes through a coil spring 6 in the intermediate pressure chamber 44. Incidentally, the needle valve 4 is not directly guided by the guide hole 31 in the third embodiment but is guided along the guide hole 31 by a spring with wings 43a in a similar manner as described above.

In the embodiments, the example where the valve body is the needle valve has been described; however, the present invention is not limited thereto but may be a ball valve having an insertion portion to be inserted into a guide member or a conical valve with a large apex angle. Also in this case, forming an intermediate pressure chamber by a rear space of the valve body (insertion portion) in a guide hole of the guide member and letting a part of a refrigerant flowed from a valve port to flow into the intermediate pressure chamber via an intermediate pressure introduction channel allow for control following a condensation pressure (pressure in a condenser 110) like in the embodiments.

Furthermore in the cases of the ball valve or the conical valve with a large apex angle, letting a stopper member arranged on a primary chamber side seen from a valve seat member to abut against an end portion of the valve body on the primary chamber side and thereby positioning the end portion on the primary chamber side allow for adjusting a bleed amount by a degree of screwing with the valve seat member like in the embodiment.

Incidentally, the present invention is not limited to the stopper member but includes a case without providing the stopper member where a bleed port may be provided to the valve body or the valve port.

Furthermore in the above respective embodiments, the example of using the coil spring as the spring member to energize the valve body toward the valve port has been described; however, a single plate spring or a lamination of a plurality plate springs may be used as the spring member. Like in the respective embodiments, also in this case noise is not generated when the refrigerant passes through the spring member in the intermediate pressure chamber.

The embodiments of the present invention have been described above in detail with reference to the drawings; however, specific configurations are not limited to these embodiments and those with modifications or the like of a design within a scope not departing from the principal of the present invention are also included in the present invention.

REFERENCE SIGNS LIST

1 main body case
11 primary chamber
12 secondary chamber
13 main body side flow channel
2 valve seat member
3 guide member
4 needle valve (valve body)
41 needle portion
42 insertion portion
44 intermediate pressure chamber
45 intermediate pressure introduction channel
46 intermediate pressure introduction channel
47 insertion portion
48 intermediate pressure introduction channel
5 adjusting screw
51 through hole
6 coil spring (spring member)
7 stopper member
71 introduction hole
L axial line

The invention claimed is:
1. A throttle device, provided between a condenser and an evaporator in a refrigerating cycle, to decompress a refrig- erant cooled by the condenser and to deliver the refrigerant to the evaporator, the device comprising:

a main body case comprising a primary chamber connected to the condenser and a secondary chamber connected to the evaporator;

a valve seat member, formed with a valve port, arranged inside the main body case and between the primary chamber and the secondary chamber;

a cylindrical guide member, coaxial with an axial line of the valve port, arranged on the secondary chamber side inside the main body case;

a valve body to allow an opening level of the valve port to be variable by moving along the axial line while guided by the guide member; and a spring member, arranged inside the guide member, to energize the valve body toward the valve port, wherein a space between the guide member and the main body case forms a main body side flow channel to deliver the refrigerant from the valve port to the secondary chamber, a rear space of the valve body within the guide member forms an intermediate pressure chamber, and an intermediate pressure introduction channel is provided to introduce the refrigerant from the valve port into the intermediate pressure chamber, and a stopper member that prevents the valve body from fully closing the valve port so that a space is always provided between the valve body and the valve seat member.

2. The throttle device according to claim 1, wherein a flow channel area of the intermediate pressure introduction channel is smaller than a flow channel area of the main body side flow channel.

3. The throttle device according to claim 1, wherein the intermediate pressure introduction channel is formed by a space between the valve body and the guide member.

4. The throttle device according to claim 1, wherein the intermediate pressure introduction channel is formed inside the valve body.

5. The throttle device according to claim 2, wherein the intermediate pressure introduction channel is formed by a space between the valve body and the guide member.

6. The throttle device according to claim 2, wherein the intermediate pressure introduction channel is formed inside the valve body.

* * * * *